United States Patent [19]
Germanier

[11] 3,856,935
[45] Dec. 24, 1972

[54] ORAL TYPHOID VACCINE AND METHOD OF PREPARING THE SAME

[75] Inventor: Rene Germanier, Muri, Switzerland

[73] Assignee: Schweizerisches Serum-und Impfinstitut und Institut Zug Erforschung der Infektionskrankheiten, Bern, Switzerland

[22] Filed: Feb. 12, 1973

[21] Appl. No.: 331,847

Related U.S. Application Data

[63] Continuation of Ser. No. 169,076, Aug. 4, 1971.

[30] Foreign Application Priority Data

Apr. 29, 1971 Switzerland.................... 6319/71

[52] U.S. Cl. .................................. 424/92
[51] Int. Cl............................................ A61k 23/00
[58] Field of Search ...................................... 424/92

[56] References Cited
FOREIGN PATENTS OR APPLICATIONS
765,378  8/1967  Canada................................. 424/92

OTHER PUBLICATIONS

Neufield et al., Methods in Enzymology, Vol. 8, published by Academic Press, New York, 1966, pages 149–161.

Anderson, Lancet, Dec. 5, 1964, pages 1196–1200.

Primary Examiner—Shep K. Rose
Attorney, Agent, or Firm—Hans Berman

[57]  ABSTRACT

Salmonella typhi strain Ty 2 is subjected to ultraviolet light, and the mutants so produced are screened for selection of strains defective in the enzyme uridine diphosphogalactose-4-epimerase, and a live vaccine is prepared from the selected and carefully isolated strains in the usual manner. The strains are also identified by their sharply reduced galactokinase and galactose-1-phosphate uridylyltransferase activity, as compared to the parent strain.

8 Claims, No Drawings

ORAL TYPHOID VACCINE AND METHOD OF PREPARING THE SAME

This is a continuation of application Ser. No. 169,076, filed on Aug. 4, 1971.

This invention relates to an oral typhoid vaccine, and to a method of preparing the same.

Although patients recovered from a typhoid infection are highly immune to Salmonella typhi, and only few cases of a second typhoid infection in the same patient are known, the available vaccines are of limited value. The known oral vaccines are even less effective than the vaccines applied parenterally, and the latter, which employ killed microorganisms, frequently produce local and general reactions.

It has been found that vaccination with killed bacteria of Salmonella typhi greatly increases the level of O—, H—, and Vi-antibodies in the blood, but there is no apparent connection between the antibody levels and the resistance of a patient against infection or reinfection [R. B. Hornick et al, New England Journal of Medicine 283 (1970) 739 – 746]. Field tests and clinical tests in volunteers also have raised serious doubts about the effectiveness of orally applied, killed typhoid vaccine (Hornick et al., l.c.).

Tests made on mice with Salmonella typhimurium or Salmonella enteritidis indicate that better results can be obtained from a live vaccine, and this assumption was confirmed by tests made on chimpanzees [B. Cjetanovic et al, Bull. World Health Organization 42 (1970) 499 – 507 ] and on human volunteers (Hornick et al, l.c.) using a streptomycin-requiring mutant of Salmonella typhi [M. Reitmann, J. Infect. Dis. 117 (1967) 101 – 107]. This strain is not suitable for producing a vaccine because its virulence and its immunogenic properties must be controlled by daily doses of streptomycin, and because its rate or spontaneous reversion to the parent strain is much too high.

The object of the invention is the provision of a stable strain of Salmonella typhi suitable for preparation of an orally applied live vaccine which is entirely free from virulence, yet of adequate immunogenic properties.

It has now been found that protection against infection with Salmonella typhi comparable with that found in patients recovered from typoid fever can be produced by all mutants of Salmonella typhi which are characterized by lacking enzyme activity of uridine diphosphogalactose-4-epimerase. Such so-called epimerase-less mutants are unable to form uridine disphosphogalactose (UDP-galactose) in the normal manner. Since UDP-galactose is a necessary intermediate in the formation of lipopolysaccharides in the cell wall of the bacteria, they can form only incomplete cell walls. Such bacterial strains have been found to be practically free of virulence.

It has also been found that the outstanding immunizing effects of such mutants are due to the fact that the lipopolysaccharides can be partly synthetized in the presence of galactose, as would be available in a living body. An excessive increase in virulence to this phenotype reversion is prevented by the fact that the galactose accepted from an ample supply is accumulated in the form of galactose-1-phosphate and UDP-galactose which cause strong bacteriolysis.

Mutants selected on the basis of a deletion in the epimerase gene are stable. They do not show even the least tendency to spontaneous reversion or to reversion due to mutagenic agents. Further enhanced stability has been found among mutants whose deletion in the epimerase gene causes a weak polar effect on the distal uridylytransferase and galactokinase genes. Such mutants are protected against mutation toward strong galactose resistance.

The oral typhoid vaccine of the invention thus is characterized by containing, as active agents, live, stable, epimerase-less mutants of virulent strains of Salmonella typhi. More specifically, the vaccine of the invention contains epimerase-negative or so-called "epimerase-less" deletion mutants of Salmonella typhi showing attenuated glactokinase and galactose-1-phosphate uridylytransferase activity.

In preparing the typhoid vaccine of the invention, spontaneous or artifically induced, stable mutants of virulent strains of Salmonella typhi are selected according to a defect in the enzyme uridine diphosphogalactose-4-epimerase, are isolated from other strains present, if any, propagated by culturing, harvested, and converted to a live vaccine in a conventional manner.

The selection method is particulary directed toward isolation of mutants showing attenuated galactokinase and galactose-1-phosphate uridylytransferase activity and the absolute stability resulting therefrom.

The selection of the desired epimerase-negative mutants is facilitated by initially infecting a culture of virulent Salmonella typhi with smooth-specific bacteriophages, preferably after treatment with mutagenic agents, unless the selection is to be made among spontaneously produced mutants. The epimerase-negative mutants of Salmonella typhi, because of their rough structure, do not provide receptors for such phages whereas the normal, virulent, and smooth bacteria undergo lysis in the presence of the phages. The preferred smoothspecific phages are those of the type FO-1. They permit the culture to be enriched with the desired mutants, and thus facilitate selection.

The vaccine is produced from the selected strains in a manner known in itself. The microorganisms are cultured in a suitable nutrient medium, separated from the medium after growth, and suspended in a protective liquid medium. The suspension is then lyophilized.

Maximum stability is a necessary requirement in a live vaccine. Reversion to virulence and an infection of the vaccinated patient with pathogenic microorganisms must be prevented. This has been achieved in this invention by the use of deletion mutants which cannot revert to the original strain. In order to reduce the hazard of a secondary mutation to a strain which is fully resistant to galactose, the preferred mutants of the invention are selected for their partial resistance to galactose, that is, among those in which the galactokinase and galactose-1-phosphate uridylyltransferase activity is reduced from about 100%, based on the original virulent strain, to not substantially more than 10%.

The oral typhoid vaccine of the invention whoce active constituent essentially consists of live bacteria has the desired high immunogenic activity, the necessary low virulence, and stably avoids reversion to the virulent form. High specific immunity against all strains of Salmonella typhi pathogenic to humans is achieved by a single, oral application.

The preparation and examination of an oral typhoid vaccine prepared from a suitably attenuated strain of Salmonella typhi will be illustrated by the following Example.

EXAMPLE 30 ml Brain-heart infusion (Difco) was inoculated with the virulent strain Ty 2 of Salmonella typhi in a 100 ml shaking flask, and the inoculated medium was kept at 37°C for 4 hours. The bacterial cells were then recovered by centrifuging and suspended in physiological saline solution in a concentration of $10^8$ microorganisms per milliliter. The suspension was exposed to ultraviolet light until 80% of the bacteria were killed.

The bacterial cells were then inoculated in fresh brain-heart infusion (Difco), and the culture was incubated at 37°C on a shaking machine. After 2 hours, it was infected with smooth-specific bacteriophages of the type FO-1 at a rate of 1 bacteriophage per 10 bacterial cells, and incubation was continued for another 3 hours, whereby the smooth bacteria were practically completely dissolved, and the rough bacteria remained.

The latter were spread on a plate of nutrient agar and incubated at 37°C for 14 hours. The colonies formed were then transferred individually to endo-agar containing 0.2% galactose instead of the lactose. The epimerase-less mutants are readily recognized on this nutrient medium by the growth shape of their colonies. Epimerase-less mutants do not ferment galactose, and are thereby distinguished from other strains. They grow in characteristic, colorless, flat colonies having a narrow outer wall and a concave center consisting mostly of cells destroyed by lysis.

Thirty such colonies were isolated and were further screened for selection of deletion mutants which do not show reversion even after mutagenic treatment of N-methyl-N'-nitro-N-nitrosoguanidine (NG). For this purpose, the isolated mutants were cultured on brain-heart intusion and treated after six hours with NG in an amount sufficient to kill 99% of the microorganisms [E. A. Adelberg et al, Biochem. Biophy. Res. Com. 18 (1965) 788 ]. The surviving cells were recovered by centrifuging, washed, again centrifuged, and suspended in brain-heart infusion. The suspension was incubated on a shaking machine at 37°C for 2 hours, and then transferred to a fresh brain-heart infusion supplemented with 0.1% galactose.

Because of the defect in the UDP-galactose-4-epimerase, the epimerase-negative mutants are unable to metabolize the absorbed galactose. Galactose-1-phosphate and UDP-galactose are accumulated, and the epimerase-negative bacteria underwent lysis within 3 - 4 hours. The surviving bacteria were spread on galactose-bearing endo-agar and cultured 14 hours at 37°C. Mutants reverting to the parent strain were readily recognized on this nutrient medium because of the formation of galactose fermenting, dark red colonies, and any colony showing even a trace of reversion in this very sensitive test was discarded, and only those mutants were selected for further screening which had not shown any reversion.

Ultimately, the tentatively selected mutants were tested for enzyme activity in the Leloir-galactose-metabolism [H. Nikaido, Biochim. Biophys, Acta 48 (1961) 460 - 469], and only those mutants were selected which did not show activity of the UDP-galactose-4-epimerase and whose galactokinase and galactose-1-phosphate uridylyltransferase activity was reduced to approximately 10% of the corresponding activity of the parent strain. For a typical mutant strain of the invention, hereinafter referred to as S. typhi SB, the activities of Leloir enzymes in $\mu$mole per mg protein per hour were as follows, as compared to the corresponding values for the parent strain Ty 2:

|   | Epimerase | Galactokinase | Galactose-1-phosphate uridylyltransferase |
|---|---|---|---|
| S. typhi Ty 2 | 24 | 3.4 | 18 |
| S. typhi SB | 0 | 0.4 | 2.5 |

The reduction in the kinase and transferase activity accompanying the deletions in the epimerase gene frequently occurs as a polar effect on the distal kinase and transferase genes. The reduction in the activity of the two last-mentioned enzymes also has a stabilizing effect on the selected mutants in impeding the formation of secondary mutants strongly resistant to galactose (H. Nikaido, l.c.).

The ultimately selected mutant was cultered in brain-heart infusion on a shaking machine at 37°C. The bacteria were harvested after six hours by centrifuging in a refrigerated centrifuge at 6,000 g, and suspended without washing in an amount of protective aqueous medium having the same volume as the discarded supernatant. The medium contained 8% saccharose, 1.5% gelatine, and 5% skim milk powder. One milliliter portions of the suspension were lyophilized in 5 ml vials.

The vaccine was preapred by opening one of the vials and inoculating its contents on a nutrient agar slant which was then incubated at 37°C. The bacteria was recovered from the surface of the slant and suspended in physiological saline solution. The suspension so obtained was used as an inoculum for 600 ml of a nutrient solution in a one liter Erlenmeyer flask. The solution was prepared by dissolving 28 g casein hydrolyzate, 10 g yeast extract, and 2 g glucose in one liter of distilled water, and adjusting the pH to 7.2 with 1N NaOH solution.

The Erlenmeyer flask was shaken at 37°C for 6 hours, and the culture was then transferred to a 25 liter batch of the same nutrient solution which was maintained at 37°C for 12 hours after the inoculation while being aerated at a rate of 5 liters of air per minute. The growth of the seed culture and of the main culture was monitored by nephelometric analysis, and the purity of the culture was checked in periodically withdrawn specimens.

At the termination of the cultivation period, the bacterial cells were harvested in a refrigerated centrifuge at 6,000 g, suspended without washing in about 600 ml of the aforedescribed aqueous protective medium, and 1 ml aliquots were lyophilized in 5 ml vials to produce a vaccine consisitng essentially of an intimate mixture of the harvested cells with a solid carrier constituted by the saccharose, gelatine, and skim milk powder of the protective medium.

The contents of one vial provided a dose fully immunizing an adult chimpanzee against typhoid fever, and were ingested while dispersed in 3 to 5 ml cold or lukewarm water or milk.

The immunizing activity of the Salmonella typhi strain Ty SB could not conveniently be monitored directly for production purposes since virulent Salmonella typhi does not produce a true infection in any conventional test animal other than the chimpanzee. When mice are injected intraperitoneally with Salmonella typhi, the bacteria are only slowly propagated, but they are also eliminated very slowly. Since the ability of inactivating salmonella at a relatively high rate is the most important factor in immunity against typhoid fever, the elimination rate was determined as a measure of the immunity reached by mice.

Mice were each vaccinated subcutaneously with $10^7$ living cells of the strain Ty SB. For comparison purposes, another group of mice was vaccinated with $10^6$ living cells of the virulent strain Ty 2, and a third group with $10^7$ cells of the same strain inactivated by heating at 58°C for 1 hour, and the application was repeated 10 days later. When the Salmonella cells in the livers and spleens of the animals were counted, it was found that the attenuated cells of the strain Ty SB were fully eliminated after 20 days, whereas the cells of the virulent strain could still be found in concentrations of $10^2$ to $10^3$ in the mice after 4 weeks in spite of the smaller original dosage.

Six weeks after the vaccination, the mice were each given $10^6$ living cells of the virulent strain Ty 2 by intraperitoneal injection, and unvaccinated controls were infested in the same manner. At the time of the injection, the animals were free to detectable bacteria introduced by the vaccination. The further fate of the bacteria injected as a challenge was monitored by counting the number of bacterial cells in the livers and spleens of sacrificed test animals after 3 to 12 days. The results are shown in Table 1.

TABLE 1

| Days after challenge | Number of challenge bacteria in liver and spleen of mice vaccinated with | | | |
|---|---|---|---|---|
| | Ty Sb | Live Ty 2 | Inact. Ty 2 | No vaccine |
| 3 | $4\times10^2$ | $10^3$ | $6.5\times10^3$ | $8\times10^3$ |
| 4 | $10^2$ | $10^3$ | $3\times10^4$ | $5\times10^4$ |
| 5 | 60 | 10 | $2.5\times10^4$ | $1.5\times10^5$ |
| 6 | 40 | 10 | $6\times10^3$ | $1.5\times10^5$ |
| 7 | 20 | 10 | $5\times10^3$ | $5\times10^4$ |
| 8 | 30 | 10 | $3\times10^3$ | $4\times10^3$ |
| 10 | 10 | 10 | $10^2$ | $4\times10^4$ |
| 11 | 10 | 10 | $1.5\times10^2$ | $9\times10^3$ |
| 12 | 10 | 10 | $5\times10^2$ | $10^4$ |

As is evident from Table 1, the concentration of virulent bacteria rose in the livers and spleens of the nonvaccinated control animals during the first 6 days after the challenge to about $10^5$ cells, and $10^4$ cells were still present after 12 days.

The animals vaccinated with the strain Ty SB, whose cells constitute the active ingredient of a vaccine of this invention, eliminated the challenge bacteria about as quickly as those animals which had been vaccinated with the virulent strain Ty 2 pathogenic in humans and had thereby been immunized.

Mice vaccinated with inactivated bacteria of the virulent smooth strain Ty 2 corresponding to the vaccines commonly employed heretofore did not react significantly different from the untreated controls.

Living cells of the virulent Salmonella typhi Ty 2 and of like strains are not permissible vaccine ingredients for humans since they would cause true typhoid fever in a vaccinated person, whereas epimerase-negative, stable mutants exemplified by the strain Ty SB do not present any risk to health.

The immunization effect of the mutants of the invention is specific against all strains of Salmonella typhi, and no protection is achieved against other species of Salmonella. Protection against Salmonella typhi cannot be obtained by vaccination with epimerase-negative nutants of other Salmonella species. The vaccine of the invention may be prepared from any virulent strain of Salmonella typhi.

Under the general conditions described with reference to Table 1, two groups of mice were vaccinated respectively with $2 \times 10^6$ live cells of the strain Ty SB and $5 \times 10^5$ live cells of the epimerase-less mutant G 30 of Salmonella typhimurium. The mice of the two groups, together with a group of nonvaccinated control animals, were then challenged with injected Salmonella typhi Ty 2, and the number of challenge bacteria was determined in the liver and spleen of mice in each group after 3 to 17 days. The results are shown in Table 2.

TABLE 2

| Vaccination | Bacteria in liver and spleen after days | | | | |
|---|---|---|---|---|---|
| | 3 | 6 | 9 | 13 | 17 |
| Ty SB | $10^3$ | 40 | 10 | 10 | 10 |
| G 30 | $9\times10^4$ | $5\times10^3$ | $2\times10^3$ | 800 | 700 |
| None | $3\times10^5$ | $7\times10^4$ | $5\times10^3$ | 600 | 1000 |

No significant protection against Salmonella typhi is achieved by vaccination with an epimerase-negative strain of *Salmonella typhimurium* whose parent strain is pathogenic to mice.

In another test series, groups of mice vaccinated with strain Ty SB of Salmonella typhi and strain G 30 of Salmonella typhimurium were infected with the strain Salmonella typhimurium LT2, which is pathogenic to mice, and the number of challenge bacteria in the liver and spleen was determined as above. The results are listed in Table 3 in which an asterisk indicates that no mouse survived to be tested.

TABLE 3

| Vaccination | Bacteria in liver and spleen after days | | | | |
|---|---|---|---|---|---|
| | 3 | 6 | 9 | 13 | 17 |
| Ty SB | $2\times10^8$ | $1.5\times10^9$ | * | * | * |
| G 30 | $10^3$ | $2\times10^3$ | 200 | 50 | 50 |
| None | $4\times10^8$ | $2\times10^9$ | * | * | * |

While the invention has been described with particular reference to specific embodiments, it is to be understood that it is not limited thereto, but is to be construed broadly and restricted solely by the scope of the appended claims. Thus, instead of Salmonella typhi Ty 2 every other Salmonella typhi strain possessing the antigenic structure 9, 12, Vi:d like Salmonella typhi AMC 42-A-63, AMC 42-A-58 or AMC strain Boxhill 58/V can be used as parent strain for the obtention of the desired mutant.

What is claimed is:

1. A method of producing an oral typhoid vaccine free from tendencies to reversion to virulence which comprises:

a. exposing a virulent strain of Salmonella typhi to a mutagenic agent until deletion mutants defective in the enzyme uridine diphosphogalactose-4-epimerase are formed;

b. infecting the exposed strain with a smooth-specific bacteriophage until the smooth bacteria present undergo lysis while rough bacteria survive because their rough structure does not provide receptors for said bacteripohage;

c. separating formed rough mutants identifiable by the sharply reduced galactokinase activity and galactose-1-phosphate uridylyl transferase activity thereof as compared to said virulent strain from other surviving rough mutants;

d. cultuting the separated mutants;

e. harvesting the cells of the cultured mutants;

f. suspending the harvested cells in a protective liquid medium consisting essentially of a dispersion of solid carrier material in a volatile liquid to form a suspension; and g. volatilizing said liquid from the solids in said suspension, 1. the amount of said harvested cells being sufficient to improve the resistance of a person to infection with Salmonella typhi after oral ingestion of said solids by said person.

2. An oral typhoid vaccine prepared by the method of claim 1 and consisting essentially of an intimate mixture of a pharmaceutically acceptable carrier and of live cells of at least one stable, non-virulent deletion mutant of a virulent parent strain of Salmonella typhi, said at least one mutant being free from uridine disphosphogalactose-4-epimerase activity and having a galactokinase activity and a galactose-1-phosphate uridylyl-transferase activity not substantially greater than 10% of the galactokinase activity and galacto-1-phosphate uridylyl-transferase activity of said parent strain, the mount of said live cells being sufficient to improve the resistance of a person to infection with Salmonella typhi after oral ingestion of said vaccine by said person.

3. A vaccine as set forth in claim 2 wherein said virulent strain has the antigenic structure 9, 12, Vi:d.

4. A vaccine as set forth in claim 2 wherein said virulent strain is Salmonella typhi AMC 42–A–63, AMC 42–A–58, or AMC strain Boxhill 58/V.

5. A vaccine as set forth in claim 2 in dosage unit form.

6. A vaccine as set forth in claim 2, wherein said virulent strain is Salmonella typhi Ty 2.

7. A vaccine as set forth in claim 2, wherein said carrier is solid.

8. A vaccine as set forth in claim 7, further comprising an ingestible liquid, said mixture being dispersed in said liquid.

* * * * *

UNITED STATES PATENT OFFICE
CERTIFICATE OF CORRECTION

Patent No. 3,856,935           Dated  December 24, 1974

Inventor(s)   RENE GERMANIER

It is certified that error appears in the above-identified patent and that said Letters Patent are hereby corrected as shown below:

In the heading, line /45/, change "Dec. 24, 1972" to

-- Dec. 24, 1974 --;

line /73/, second line, change "Zug" to -- zur -- line /63/, after "1971" insert
-- , now abandoned --.

In the claims:

claim 1, line 12, change "bacteripohage" to
-- bacteriophage --.

claim 2, line 12, change "mount" to -- amount --.

Signed and Sealed this nineteenth Day of August 1975

[SEAL]

Attest:

RUTH C. MASON
Attesting Officer

C. MARSHALL DANN
Commissioner of Patents and Trademarks

UNITED STATES PATENT AND TRADEMARK OFFICE

CERTIFICATE EXTENDING PATENT TERM
UNDER 35 U.S.C. 156

Patent No.      : 3,856,935

Dated           : December 24, 1972

Inventor(s)     : Rene Germanier

Patent Owner    : Swiss Serum and Vaccine
                  Institute Berne

This is to certify that there has been presented to the

COMMISSIONER OF PATENTS AND TRADEMARKS an application under 35 U.S.C. 156 for an extension of the patent term. Since it appears that the requirements of the law have been met, this certificate extends the term of the patent for the period of

2 YEARS with all rights pertaining thereto as provided by
35 USC 156 (b).

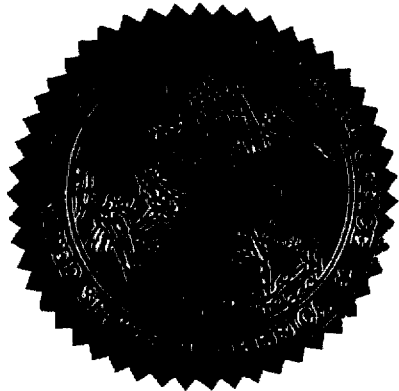

I have caused the seal of the Patent and Trademark Office to be affixed this 26th day of November 1990.

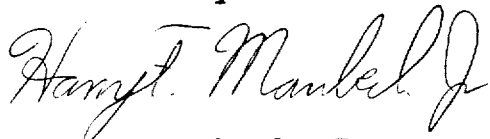

Harry F. Manbeck, Jr.
Assistant Secretary and Commissioner
of Patents and Trademarks